United States Patent
Milne et al.

(10) Patent No.: US 9,704,239 B1
(45) Date of Patent: Jul. 11, 2017

(54) VIDEO TRIGGER SYNCHRONIZATION FOR IMPROVED PARTICLE DETECTION IN A VESSEL

(71) Applicant: Amgen Inc., Thousand Oaks, CA (US)

(72) Inventors: Graham Frank Milne, Thousand Oaks, CA (US); Dmitry Fradkin, Woodland Hills, CA (US); Thomas Clark Pearson, Newbury Park, CA (US); Bonchull Chris Koo, La Crescenta, CA (US); Erwin Freund, Camarillo, CA (US)

(73) Assignee: AMGEN INC., Thousand Oaks, CA (US)

( * ) Notice: Subject to any disclaimer, the term of this patent is extended or adjusted under 35 U.S.C. 154(b) by 0 days.

(21) Appl. No.: 15/256,429

(22) Filed: Sep. 2, 2016

(51) Int. Cl.
*G06T 7/00* (2017.01)

(52) U.S. Cl.
CPC ............ *G06T 7/001* (2013.01); *G06T 7/0044* (2013.01); *G06T 2207/10141* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 4,136,930 A * | 1/1979 | Gomm | G01N 21/8851 250/223 B |
| 5,905,568 A | 5/1999 | McDowell et al. | |
| 6,082,205 A * | 7/2000 | Zborowski | G01N 15/10 73/865.5 |
| 7,430,047 B2 | 9/2008 | Budd et al. | |
| 9,418,416 B2 | 8/2016 | Milne et al. | |
| 2005/0248765 A1* | 11/2005 | Budd | G01N 15/1459 356/427 |
| 2006/0244964 A1 | 11/2006 | Cox et al. | |
| 2008/0001104 A1 | 1/2008 | Voigt et al. | |
| 2008/0226126 A1 | 9/2008 | Ohno | |
| 2008/0291438 A1* | 11/2008 | Akkerman | B07C 5/3404 356/240.1 |

FOREIGN PATENT DOCUMENTS

| | | |
|---|---|---|
| CN | 101438143 A | 5/2009 |
| JP | 63-088431 A | 4/1988 |
| SU | 922596 | 4/1982 |

* cited by examiner

*Primary Examiner* — Wesley Tucker
(74) *Attorney, Agent, or Firm* — Marshall, Gerstein & Borun LLP

(57) ABSTRACT

A method includes, during an agitation period of an agitation profile, applying a motion to a transparent vessel containing a fluid, and while applying the motion; acquiring a sequence of original images of a portion of the transparent vessel; generating a background image from the sequence of original images; generating a resultant image from the background image and an original image in the sequence of original images; and identifying from the resultant image a particle in the fluid.

24 Claims, 6 Drawing Sheets

VIDEO TRIGGER SYNCHRONIZATION FOR IMPROVED PARTICLE DETECTION IN A VESSEL

FIELD OF THE DISCLOSURE

The present application relates generally to particle detection in fluid-filled vessels.

BACKGROUND

A fluid may contain particles in a variety of different shapes and sizes. The fluid may intentionally contain particles, or may unintentionally contain particles. Unintentional particles can originate from a number of different sources, such as from the environment, from incorrect handling or storage of the fluids, or as a residual from forming, packaging or filling of a vessel holding the fluid. The fluid can also contain bubbles.

SUMMARY OF THE DISCLOSURE

In an embodiment, a method includes: during an agitation period of an agitation profile, applying a motion to a transparent vessel containing a fluid, and while applying the motion; acquiring a sequence of original images of a portion of the transparent vessel; generating a background image from the sequence of original images; generating a resultant image from the background image and an original image in the sequence of original images; and identifying from the resultant image a particle in the fluid.

In an embodiment, an inspection system includes an agitator configured to receive a transparent vessel containing a fluid and apply a motion to the transparent vessel during an agitation period of an agitation profile. An imager acquires a sequence of original images of the transparent vessel as the agitator applies the motion. A controller receives from the imager the sequence of original images, identifies common features of at least two original images in the sequence of original images, generates a background image including the common features, generates one or more resultant images from the background image and the sequence of original images, and identifies, from the background image, a particle in the fluid.

In an embodiment, a method includes: during an agitation period of an agitation profile, acquiring a sequence of original images of a portion of a transparent vessel; determining a background image from the sequence of original images; generating at least one resultant image from the background image and the sequence of original images; and identifying from the resultant image at least one particle in the fluid.

BRIEF DESCRIPTION OF THE DRAWINGS

The skilled artisan will understand that the figures, described herein, are included for purposes of illustration and are not limiting on the present disclosure. The drawings are not necessarily to scale, emphasis instead being placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
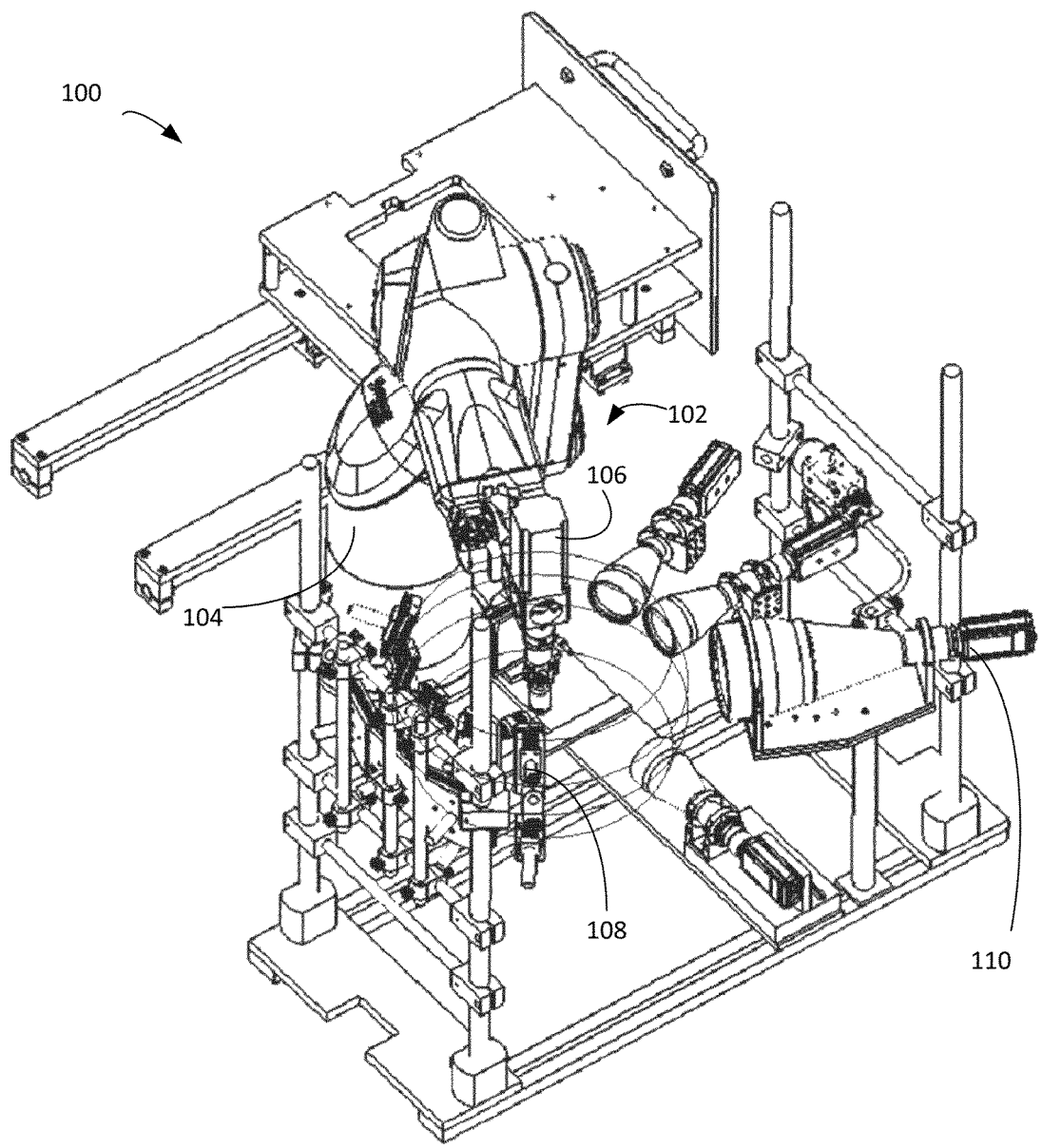
FIG. 1 illustrates a visual inspection system according to an embodiment of the present disclosure.

FIG. 1 illustrates an inspection system 100 according to an embodiment of the present disclosure. The system 100 includes an agitator 102, which includes a robotic subsystem 104 and a spindle 106. The system 100 further includes an illumination system 108 including one or more illuminators to illuminate a vessel held by the agitator 102, and one or more imagers 110 that acquire images of the vessel as the vessel is agitated by the agitator 102.

Additional detail regarding components of the system 100 is provided below. As an overview, the system 100 is configured to image the vessel as an agitation profile is applied to the vessel. Images may be acquired during any segment of the agitation profile applied to the vessel. The system analyzes two or more images of the vessel to determine if particles are present in the vessel. The two or more images may further be analyzed to count a number of particles present, size particles, track particle movement, or characterize particles. Particles may be, for example, dust or other contaminants, or proteins. In the present disclosure, particles are discussed; however, it is to be understood that the concepts of the present disclosure apply also to bubbles.

The agitation profile includes one or more agitation periods. During each agitation period of the agitation profile, a motion is applied to the vessel or a motion is discontinued. For example, a first motion in a first agitation period may be followed by a second motion in a second agitation period, or a first motion in a first agitation period may be followed by a discontinuation of the first motion in the second agitation period. A motion may be shaking, spinning, applying ultrasonic energy, applying acoustic energy, flipping, another motion, or any combination thereof.

A discontinuation of a motion may or may not include applying a force to the vessel to counteract the motion, such as applying a braking force. A braking force may be, for example, a friction force. In general, an agitation period incorporating a discontinuation of a motion is referred to herein as a rest period. A rest period may include an initial time during which the fluid in the vessel continues to move, and may further include a subsequent time during which the fluid in the vessel is at rest.

Images of a vessel may be acquired during one or more agitation periods of the agitation profile. Acquisition of images is timed to correspond to one or more positions of the vessel. A sequence of images acquired at a single position of the vessel is used to detect particles in a fluid in the vessel, as will be described below. A sequence of images can be acquired at each of multiple positions of the vessel.

By way of non-limiting example, in one or more embodiments, the agitation profile includes a first motion in a first agitation period, followed by a sudden halt and a rest period in a second agitation period in which the agitator 102 provides no additional motion (e.g., discontinues the first motion), and then a second motion in a third agitation period. Images may be acquired during one or more of the first agitation period, second agitation period, or third agitation period. In one or more such embodiments, the first motion is a spinning motion, and a fluid within the vessel can continue to momentarily spin during the rest period as the system acquires images of the spinning fluid. However, fluids with a high viscosity can quickly come to rest once the vessel stops spinning, which can make it difficult to acquire images of particles suspended in the fluid because they also quickly come to rest. For such fluids (or other fluids), the system described herein can, for example, omit the sudden halt and rest period and instead use an agitation profile in which a first motion in the first agitation period is a spinning motion, and a second motion in the second agitation period is also a spinning motion (which may be at different rate than the first spinning motion) that allows for particles to continue moving during image acquisition and analysis. Many other agitation profiles are within the scope of the present disclosure, some of which are described herein.

The system 100 can synchronize the acquiring of the images with the agitation profile. For example, for spinning motions around a single axis, a sequence of two or more images of a same portion of the vessel are acquired, where each image is acquired when the vessel is in a particular angular position, and each image is acquired during different revolutions. In this manner, portions of the image that do not change during the motion can be ignored, such as grease or grime on a wall of the vessel or reflections from a wall of the vessel, and therefore particles can be identified from the images as discussed below.

In one or more embodiments, an imager 110 can acquire a sequence of images for each of multiple portions of the vessel, where each image in a single sequence is acquired at a different revolution of the vessel.

In one or more embodiments, multiple imagers 110 acquire images of the vessel from different locations in the inspection system 100, such as, for example, for faster parallel imaging, for wide angle versus narrow angle imaging, for small area versus large area imaging, for color versus infrared imaging, and so forth.

Referring now back to FIG. 1, the spindle 106 is coupled to the robotic subsystem 104. The agitator 102 (including the robotic subsystem 104 and the spindle 106) is configured to generate one or more agitation profiles. The agitation profiles can include shaking, spinning, applying ultrasonic energy, applying acoustic energy, flipping, or any combination thereof. The agitation profiles are applied to the vessel to set particles in the fluid in motion, and then optionally retain the particles in motion. Different agitation profiles may be generated based on, for example, size or shape of the vessel, viscosity of fluid in the vessel, amount of fluid in the vessel, an expected amount of particles in the vessel, other factors, or a combination thereof.

As the agitator 102 applies the agitation profile (e.g., as the spindle 106 spins the vessel), the imager 110 acquires images of the vessel. The imager 110 acquires images of the vessel as sequences of images, where each subsequent image in the sequence of images is taken a predetermined number of whole rotations after the immediately preceding image of the sequence of images, and each image in the sequence of images is of a same area of the vessel. For example, if a first image is acquired after the vessel rotates x degrees, a second image is acquired after the vessel rotates x+360n degrees, where n is an integer number of rotations between the acquisition of the first image and the second image. Each image after the initial image is acquired after the vessel rotates x+360n degrees, and n is different for each image (e.g., images are acquired at n=n1, n2, n3, and so forth in any increasing sequence of n).

Rotation in the present disclosure indicates angular movement about any axis defined with respect to the vessel, including a longitudinal axis along a length of the vessel, or an axis at any angle to the longitudinal axis. Further, rotation can refer to continuous movement about the axis, or can refer to oscillatory motion. For example, one or more revolutions, or partial revolutions, may be in a first direction, followed by one or more revolutions, or partial revolutions, in a second direction. The second direction may be opposite the first direction, but is not necessarily so. Also, oscillation may include a back-and-forth motion in two directions, but may additionally or alternatively include a sequence of motions in more than two directions, which sequence may or may not be repetitive.

Figure 2:
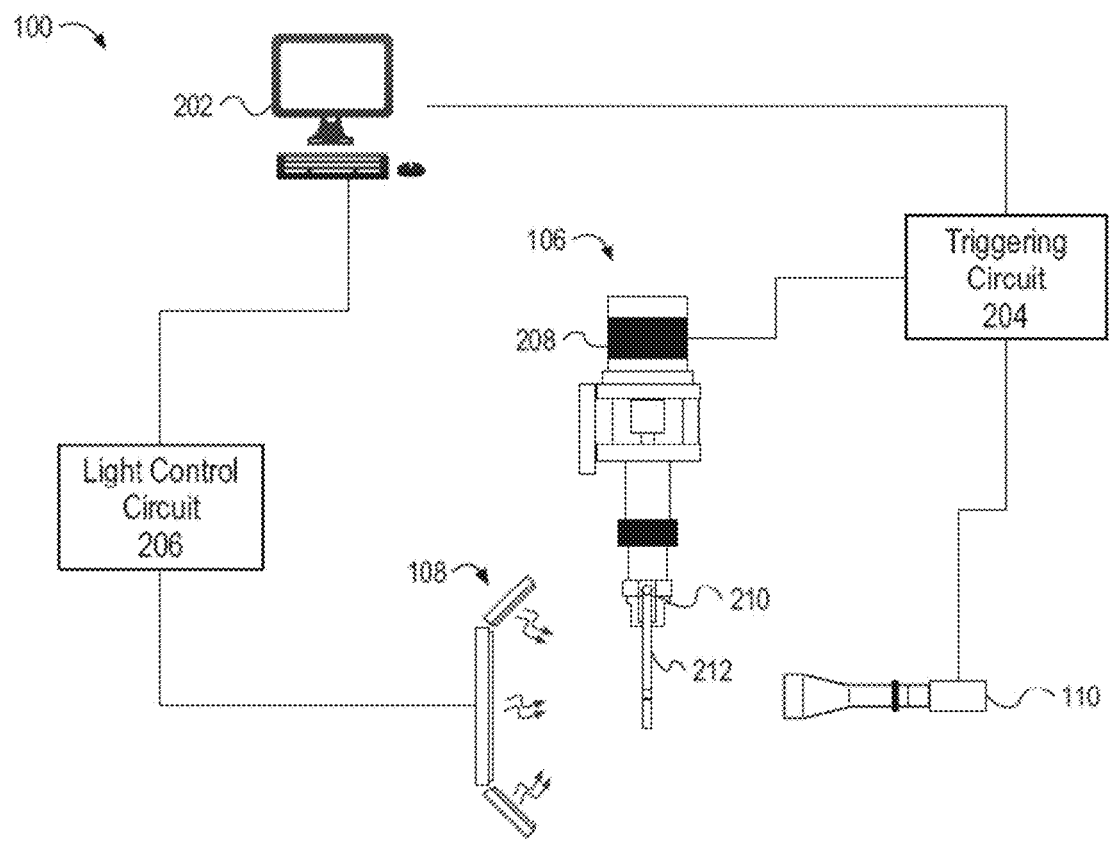
FIG. 2 illustrates a visual inspection system according to an embodiment of the present disclosure.

FIG. 2 illustrates an example of the system 100 according to an embodiment of the present disclosure. As described above, the system 100 includes the spindle 106 which is part of the agitator 102, the illumination system 108, and the imager 110. The system 100 further includes a controller 202 (illustrated as a computer in this embodiment), a triggering circuit 204, and a light control circuit 206.

The spindle 106 includes a gripper 210 that is spun by a motor 208. The gripper 210 is configured to grasp and hold a vessel 212. In some implementations, the gripper 210 is a pneumatic gripper, electric gripper, or a vacuum gripper. In other implementations, the gripper 210 can include multiple fingers that are controlled by the controller 202 to secure the vessel 212 to the spindle 106. The motor 208 can be a servo motor, stepper motor, or other electric motor. The motor 208 can spin the vessel 212 around a central axis of the spindle 106. In some implementations, the motor 208 is configured to spin the vessel 212 at between about 200 rpm and about 2000 rpm, such as between about 200 and about 1500 rpm, between about 200 rpm and about 1000 rpm, between about 500 rpm and about 800 rpm, or between about 500 rpm and about 2000 rpm. For example, in one or more embodiments, the motor 208 can rotate the vessel 212 at a relatively high rate (e.g., above 800 rpm) during a first agitation period of an agitation profile, and at a relatively low rate (e.g., below about 100 rpm) during a subsequent agitation period of the agitation profile. The rate at which the motor 208 spins the vessel 212 can be controlled by the controller 202.

In one or more embodiments, the robotic subsystem 104, or the robotic system 104 and the spindle 106 of the agitator 102, are components of a pick-and-place robotic system in the inspection system 100. For example, the controller 202 can control the agitator 102 to retrieve the vessel 212 from a storage unit, transport the vessel 212 (held by the gripper 210) into the image acquisition area (e.g., an area where the imager 110 is focused), initiate the agitation profile, and return the vessel 212 to the storage unit or another location after the agitation profile and corresponding image acquisition is complete. It is to be understood that other techniques for retrieving the vessel 212, placing the vessel 212, or moving the vessel 212 to a location may be used, such as techniques incorporating a conveyor, a starwheel, or other transporter.

The robotic subsystem 104 may have multiple degrees of freedom (e.g., two or more of x, y, z, yaw, pitch, or roll), which is in addition to the spinning capability provided by the spindle 106. In one or more embodiments, the robotic subsystem 104 has six degrees of freedom (x, y, z, yaw, pitch, and roll). In one or more embodiments, the robotic subsystem 104 can invert or shake the vessel 212, and an agitation profile can include inverting and/or shaking of the vessel.

The imager 110 is configured to collect images of the vessel 212 as the agitator 102 applies an agitation profile to the vessel 212. The system 100 can include multiple imagers 110. In some implementations, each of multiple imagers 110 are configured similarly, and in other implementations, ones of multiple imagers 110 are configured differently. For example, multiple imagers 110 can each include one or more lenses, and the lenses of different imagers 110 may have a same or a different focal length or aperture dimension. For another example, each imager 110 can include one or more light filters, and the filters of different imagers 110 can filter light across a same or different spectra. In a further example, each of multiple imagers 110 can include a telescopic lens of different focal lengths to create different views of the vessel 212.

Multiple imagers 110 can be positioned radially around the vessel 212. In one or more embodiments, each of multiple imagers 110 are positioned at a same vertical height with respect to a given surface (e.g., a floor, a pad or a table on which the inspection system is positioned, a top surface of the spindle 106, or other surface); in other embodiments, the imagers 110 may be positioned at different heights with respect to the surface, such as to acquire different image areas along a length of the vessel 212.

The images acquired by the imager 110 can be transmitted to the controller 202 for storage and analysis. In some implementations, the imager 110 acquires individual still images of the vessel 212 as the agitator 102 applies agitation to the vessel 212. In other implementations, the imager 110 is a video imager and acquires video of the agitated vessel 212; the imager 110 can be synchronized with the agitator 102 such that the controller 202 can extract video frames that correspond to the vessel 212 at specific angular positions.

The triggering circuit 204 is configured to determine the location of the vessel 212 and generate triggers that cause the imager 110 to acquire an image. Determining the location of the vessel 212 can include determining or tracking the vessel's rotation from a starting position.

In one or more embodiments, the motor 208 generates pulses that correspond to a predetermined degree of rotation. By way of non-limiting example, the motor 208 can include a rotary encoder that generates a pulse for every 0.01, 0.1, 0.2, 0.5, 1, 2, 5, or 10 degrees of rotation. The rotary encoder can be an absolute encoder or an incremental rotary encoder. The triggering circuit 204 can count the pulses received from the motor 208 and generate a trigger signal to trigger the imager 110 after every $n^{th}$ pulse, where n is an integer. For example, the triggering circuit 204 can generate a trigger signal after the receipt of every ninth pulse; in an implementation in which a pulse is generated for each degree of rotation of the vessel 212, acquiring an image every ninth pulse will result in an image every nine degrees of rotation of the vessel 212. It is to be understood that a pulse may or may not represent one degree of rotation, and the foregoing is provided by way of example.

As noted above, multiple images may be acquired for each revolution of the vessel 212. The triggering circuit 204 can cause images to be acquired based on pulses from the rotary encoder. For example, images may be acquired at rising edges or falling edges of the pulses, at both rising and falling edges of the pulses, at high and/or low logic levels of the pulses, or based on a logical combination of edges and/or levels of pulses from two or more rotary encoders. Other techniques for triggering image acquisition are also encompassed by the present disclosure.

In one or more embodiments, the triggering circuit 204 includes electronic switching circuitry, such as a solid state relay or transistor, that activates to supply the trigger signal to the imager 110.

In some implementations, the triggering circuit 204 is configured to filter the pulses received from the rotary encoder. The filtering can avoid counting spurious pulses (e.g., in practice, the motor 208 may occasionally generate an additional spurious pulse through unstable motor motion that results in a brief reversal of rotation direction, or electrical noise present in a pulse can appear to be one or more additional pulses). In one or more embodiments, the triggering circuit ignores a pulse that arrives too quickly after a prior pulse.

In one or more embodiments, the triggering circuit 204 transmits the trigger signal to the controller 202, which can trigger the imager(s) 110 and also can provide trigger information to the light control circuit 206, such as to synchronize strobes of one or more illuminators in the illumination system 108.

In one or more embodiments, the triggering circuit 204 includes, or is implemented by, a computing device, such as a general purpose processor, a microcontroller, a field-programmable gate array (FPGA), an application specific integrated circuit (ASIC), discrete circuitry, or a device incorporating a combination thereof. In some implementations, the triggering circuit 204 can be a component of the agitator 102 or the controller 202.

The light control circuit 206 controls the illumination system 108. The illumination system 108 can include one or more illuminators that are disposed around the spindle 106 and the vessel 212. The illumination system 108 can illuminate the vessel 212 during image acquisition. The illumination system 108 can include LEDs, lasers, fluorescent bulbs, incandescent bulbs, flash lamps, or any other suitable illuminator or combination of suitable illuminators. The illumination system's illuminators can be configured to generate broadband light or light within specific wavelength bands. For example, the illumination system 108 can generate light centered around about 630 nm (e.g., red light). In some implementations, the illumination system 108 generates ultraviolet or infrared light. The illuminators of the illumination system 108 can be disposed at different locations and angles with respect to the vessel 212.

In one or more embodiments, the light control circuit 206 includes, or is implemented by, a computing device, such as a general purpose processor, a microcontroller, an FPGA, an ASIC, discrete circuitry, or a device incorporating a combination thereof. In some implementations, the light control circuit 206 can be a component of the agitator 102 or the controller 202.

In some implementations, controlling the illumination system 108 can include setting an intensity of light generated by illuminators of the illumination system 108. The light control circuit 206 can control which illuminators of the illumination system 108 are active and which type of lighting mode is active (e.g., backlight, rear-angled lighting, infrared). In some implementations, the light control circuit 206 can synchronize with the triggering circuit 204 to initiate a light strobe timed to occur when the imager 110 acquires an image.

Figure 3:
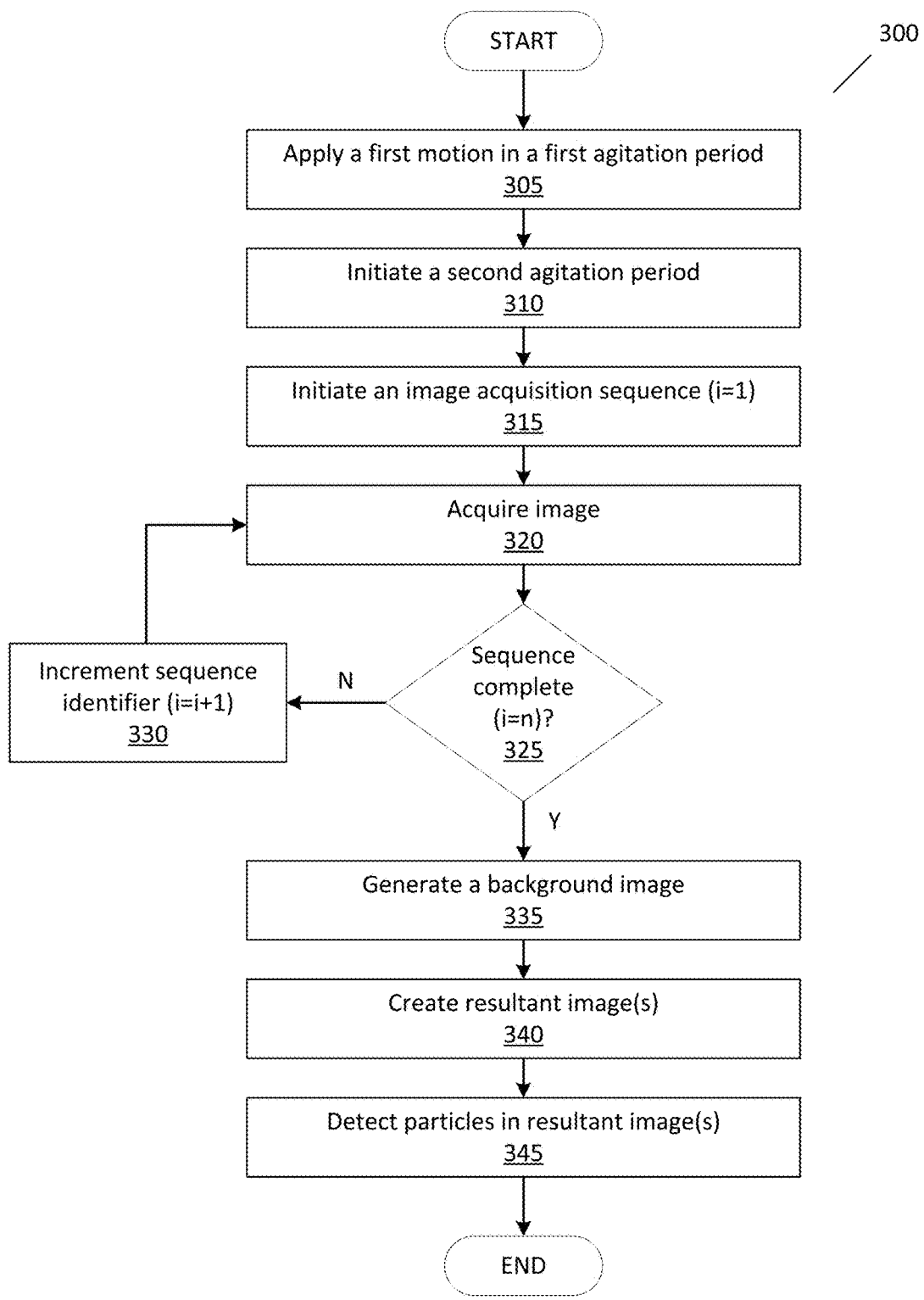
FIG. 3 illustrates an example of a method for identifying particles in a fluid.

FIG. 3 illustrates a diagram of an example method 300 for identifying particles in a fluid in an inspection system (e.g., the inspection system 100 in FIG. 1 or FIG. 2) according to an embodiment of the present disclosure. The method 300 includes applying a first motion or motions to a vessel (e.g., vessel 212) during a first agitation period of an agitation profile (block 305). The method further includes initiating a second agitation period of the agitation profile (block 310), where the second agitation period may include a second motion or motions applied to the vessel. The second agitation period may follow the first agitation period directly, or there may be additional agitation periods between. During the second agitation period, a sequence of n images are acquired, where each of the n images is acquired when the vessel reaches a particular position and orientation (e.g., at a same angular position at each of n rotations, where the n rotations need not be sequential rotations), and n is an integer greater than or equal to one. The acquisition of the sequence of n images is initiated (block 315), such as by setting an index value i equal to 1. A first image of the sequence of n images is acquired (block 320) (e.g., by an imager 110). A determination is made whether the entire sequence of n images has been acquired (block 325). If not, the index value i is incremented (block 330), and a next one of the sequence of n images is acquired (block 320). If the entire sequence of n images has been acquired (block 325), the n images may then be used to generate a background image (block 335). For example, a background image may be generated by identifying common features of two or more of the sequence of n images. The background image includes the common features. The background image may then be used to prepare resultant images from the sequence of n images (block 340). For example, the background image may be subtracted from each of one or more of the sequence of n images, to prepare a corresponding one or more resultant images, where the common features of the background image are reduced or eliminated from the resultant images. Other techniques for preparing resultant images (other than subtraction) can be used, such as minimum intensity projection, maximum intensity projection, or other techniques. From the one or more resultant images, particles may be detected (block 345)(see, e.g., the example of FIG. 5). From two or more of the resultant images, particles may be tracked.

The vessel can be any type of vessel configured to contain fluid. In some implementations, the walls of the vessel are transparent such that the fluid within the vessel can be visualized by an imager (e.g., the imager 110). For example, the vessel can be a syringe, a vial, a beaker, or other vessel. In some implementations, an air gap exists along with the fluid in the vessel; the air gap can generate a vortex in the meniscus of the fluid as the vessel is spinning, which facilitates continuing motion of the fluid after the spinning is stopped. In other implementations, an air gap does not exist in the vessel, a vortex is not formed as the vessel is spinning, and the fluid may stop spinning (and thus the particles stop moving) shortly after the vessel stops spinning, before images can be acquired. Similarly, for highly viscous fluids, fluid drag against the interior walls of the vessel may cause the fluid to stop spinning (and thus the particles to stop moving) shortly after the vessel stops spinning, before images can be acquired. For such situations, the systems and techniques of the present disclosure provide for an agitation profile which includes an agitation period during which motion of the fluid and particles is maintained and images are acquired. For example, a first agitation period may include one or more violent motions (in sequence or concurrently) such as spinning, shaking or inversion(s), to dislodge particles from the interior of the vessel, followed by a second agitation period less violent than the first agitation period, in which the motion of the fluid is controlled to keep the particles in motion and available for imaging.

When violent agitation periods are included in the agitation profile to dislodge particles, the violent agitation may be caused by motion of an agitator (e.g., the agitator 102) moving the vessel, or may be caused by applying acoustic or ultrasonic energy to the fluid in the vessel.

Figure 4:
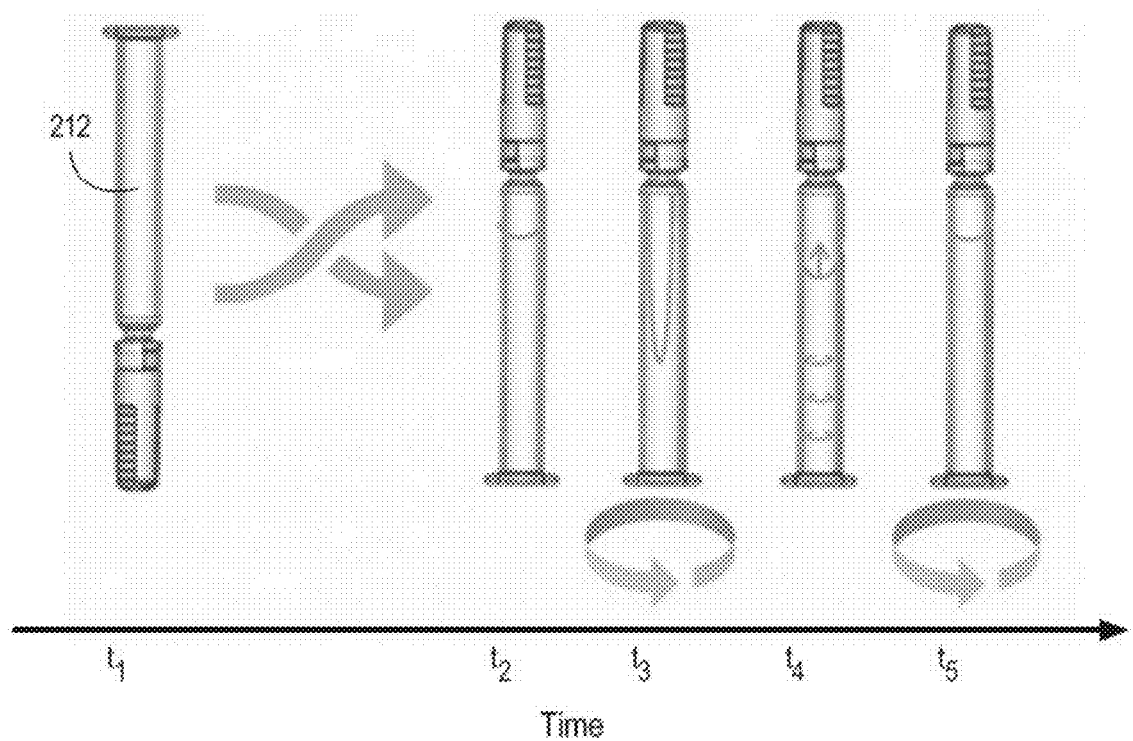
FIG. 4 illustrates a vessel at different time points during application of an agitation profile.

FIG. 4 (with reference also to FIGS. 1 and 2) illustrates a vessel 212 at different time points during an application of an agitation profile according to an embodiment of the present disclosure. The vessel 212 is illustrated as a syringe in FIG. 4 for convenience; however it is to be understood that the concepts apply to other vessels as well.

In FIG. 4, the agitator 102 (FIG. 1) can invert the vessel 212 one or more times in a first agitation period between the time point $t_1$ and the time point $t_2$ (e.g., rapidly flipping the vessel 212, as indicated by the needle-end-down position at time point $t_1$, the needle-end-up position at time point $t_2$, and the crossing arrows between the time point $t_1$ and the time point $t_2$). Flipping the vessel 212 can dislodge particles from the vessel wall and needle nozzle. A number of times or a duration of time that the vessel 212 is flipped may be determined according to the particular vessel 212 (e.g., according to a type, shape, or material of the vessel 212), properties of a fluid in the vessel 212 (e.g., viscosity, molecular weight, expected number of particles, density, or other property), an amount of time since the vessel 212 was filled with the fluid, a size of an air gap in the vessel 212 or a lack of an air gap, or a combination thereof. During the first agitation period (between the time point $t_1$ and the time point $t_2$), the vessel 212 is optionally spun at a first rotational velocity by the spindle 106 as the vessel 212 is flipped. For example, the spindle 106 may rotate the vessel 212 while the robotic system 104 flips the spindle 106 (and the vessel 212).

In the embodiment illustrated in FIG. 4, the flipping stops at a time point $t_2$, and there is a rest period (during a second agitation period) between time point $t_2$ and a time point $t_3$. At the time point $t_3$, a third agitation period of the agitation profile begins, in which the vessel 212 is spun at a second rotational velocity to set the fluid and particles in motion. In the embodiment illustrated in FIG. 4, the vessel 212 includes an air gap, and the spinning causes a vortex to appear in the fluid. At a time point $t_4$, the spinning is discontinued, and the fluid in the vessel 212 continues to spin for a bit during a fourth agitation period (rest period) between the time point $t_4$ and the time point $t_5$. Images may be acquired of the stationary vessel by the imager(s) 110 during the fourth agitation period (rest period), such that each image of a sequence of images is acquired while the fluid is spinning and the vessel is stationary, and video synchronization (with vessel motion) is not needed. At a time point $t_5$, while the fluid is still spinning in the vessel 212, or after the fluid stops spinning, a fifth agitation period of the agitation profile begins, in which the vessel 212 is spun at a third rotational velocity. The third rotational velocity may be slower or faster than the second or the first rotational velocity, and the second rotational velocity may be slower or faster than the first rotational velocity.

As noted above, multiple imagers (e.g., imagers 110) may acquire images from different locations around the vessel. The imagers can be evenly distributed around the vessel, or may be unevenly distributed around the vessel. Additionally, each imager may acquire images at evenly distributed angles of rotation of the vessel, or may acquire images at angles that are not evenly distributed. For example, images may be acquired each ten degrees of rotation of the vessel in an evenly distributed manner (or any other evenly distributed manner). For another example, images may be acquired at 10 degrees, at 15 degrees, at 50 degrees, and at 300 degrees (or any other combination of unevenly distributed angles).

Figure 5:
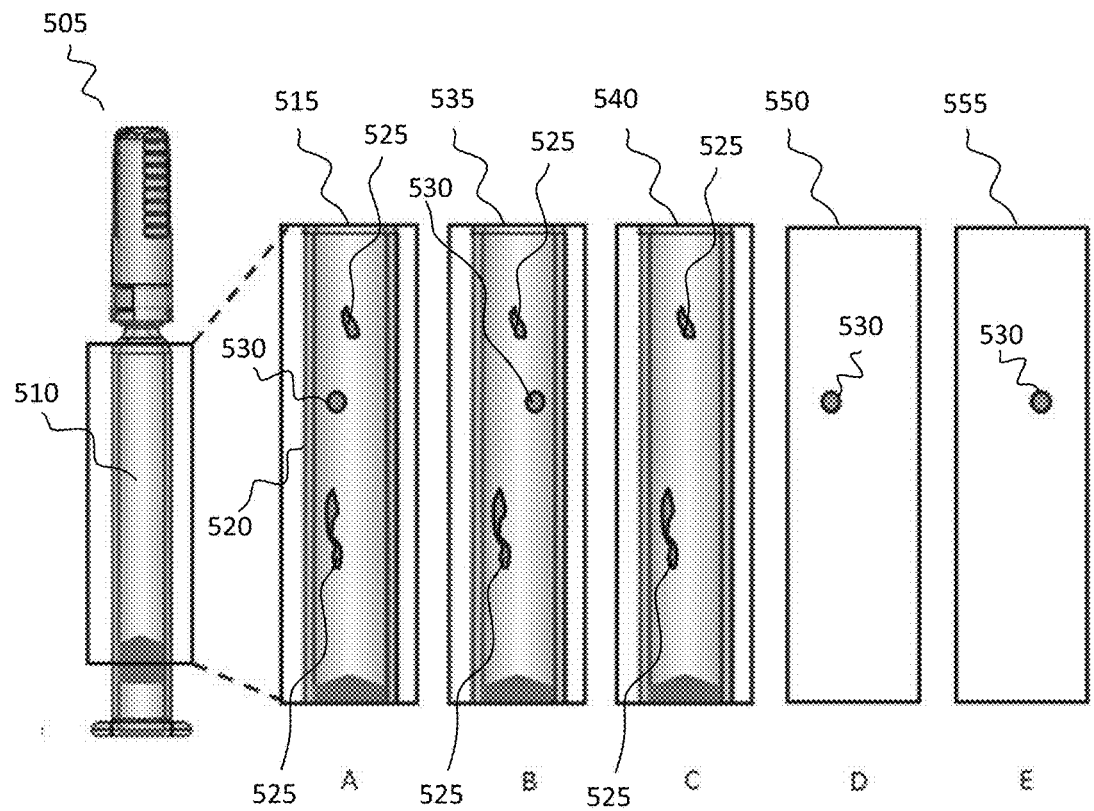
FIG. 5 illustrates an example of images acquired and processed according to techniques of the present disclosure.

FIG. 5 provides an example of an efficacy of the system and techniques of the present disclosure. A fluid-filled vessel 505 in this example is a syringe. The rectangular outlined section represents a portion 510 of the vessel 505 that is to be analyzed for particles (e.g., a portion 510 on which an imager 110 is focused).

A sequence of n=2 original images 515, 535 are obtained of the portion 510 of the vessel 505. The original image 535 is acquired at a time subsequent to the acquisition of the original image 515. Each of the sequence of original images 515, 535 is acquired at a same position and degree of rotation of the vessel 505. In each of the original images 515, 535, a syringe wall 520 or artifacts associated with the syringe wall 520 and other background features 525 (e.g., contamination on the syringe wall 520) are visible. A particle 530 is also visible in each of the sequence of original images 515, 535.

From the sequence of original images 515, 535, a background image 540 is generated, which includes the syringe wall 520 or artifacts associated with the syringe wall 520 and the background features 525. Not included in the background image 540 is the particle 530, which is at different locations in the original images 515, 535 and thus is not a common background feature 525.

The background image 540 is then used to generate a resultant image 550 from the original image 515, and a resultant image 555 from the original image 535, such as through subtraction, minimum intensity projection, maximum intensity projection, or other technique. The resultant images 550, 555 include the particle 530, but the common features (syringe wall 520, background features 525) are reduced or eliminated in the resultant images 550, 555. Thus, the particle 530 can be counted or sized from either of the resultant images 550, 555, and the particle 530 may be tracked between the sequence of resultant images 550, 555. Additionally, by knowing characteristics of the fluid and the fluid motion, characteristics of the particle 530 may be determined based on its velocity and trajectory, which can be identified from the sequence of resultant images 550, 555.

It is to be understood that although a sequence of n=2 original images (images 515, 535) and a corresponding sequence of two resultant images (images 550, 555) are illustrated and described with respect to FIG. 5 for ease of understanding, an original image sequence can include two or more original images, and a resultant image sequence can include two or more resultant images. Note also that not all of the original images need be used to generate the background image, and not all of the original images need be used to generate the sequence of resultant images. Accordingly, a sequence of original images may include more original images than there are resultant images in a corresponding sequence of resultant images.

The resultant images 550, 555 in FIG. 5 illustrate the identification of a single particle. It is to be understood that the techniques described in the present disclosure may be used to identify multiple particles. Additionally, the techniques of the present disclosure may be used to acquire images by the same imager at multiple times during a revolution of the vessel (and repeated over one or more subsequent revolutions), such that a single imager can be used to identify particles from resultant images generated for each of different positions of the vessel. Further, multiple resultant images from different positions of the vessel (using one imager or multiple imagers) may be evaluated to track a particle as it moves around the vessel to avoid marking or counting a particle more than once, or to verify that all particles are identified or counted to a degree of certainty.

The system and techniques of the present disclosure have been shown to be effective for a wide variety of vessels, including a 6.3 millimeter (mm) inner diameter syringe.

In an embodiment of the present disclosure, an agitation profile for a syringe includes a first agitation period in which the syringe is rapidly flipped three times along the long axis (e.g., as indicated in FIG. 4) while spinning the syringe at about 500 revolutions per minute (rpm). This movement dislodges particles from the container wall and needle nozzle, allowing them to move within the bulk liquid where they can be effectively acquired in images. The agitation profile further includes a second agitation period after the flipping is ended in which the syringe is rotated briefly (e.g., for one or two seconds) at about 800 rpm. The agitation profile further includes a third agitation period in which the syringe is rotated (e.g., at a slower rate, such as at about 40 rpm, or other rate). An integer number x of images are taken every complete revolution of the syringe, corresponding to x fixed, evenly spaced motor positions per revolution. It has been found that x=40 is a useful value for some syringes, although other integer values were also found to be useful.

For subtraction to properly cancel stationary image features, image acquisition is triggered precisely with respect to rotation of the syringe. In an embodiment of the present disclosure, a microcontroller receives two motor encoder signals which track small changes in movement of a motor shaft of the motor. The two motor encoder signals each include a train of pulses which can be used to determine rotational direction and speed and thus relative position of the motor shaft. Therefore, each full rotation from an arbitrary starting position may be identified by counting a number of pulses in a motor encoder signal that represent 360 degrees of rotation. Accordingly, successive images in an image sequence can be acquired with an integer number of rotations between. If the pulses are properly tracked from a known position, an absolute rotational position of the motor shaft may also be determined from the pulses.

By way of example, two motor encoder signals A and B may be 90 degrees out of phase with each other; when signal A goes to a high logic level while signal B is at a low logic level, it can be determined that the motor is rotating in a first direction (e.g., clockwise), and when signal A goes to a high logic level while signal B is at a high logic level, it can be determined that the motor is rotating in a second direction opposite the first direction (e.g., counterclockwise). Logic levels of signal A or signal B, edge transitions of signal A or signal B, or a logical combination of logic levels or edge transitions of signals A, B (e.g., "A and B", "A or B", "A not B", "A xor B" and so forth), can be used to trigger an image capture. If edge transitions of both signal A and signal B are used for a motor providing a shaft angle resolution of 1000 positions per revolution, there will be 4000 edge transitions in one revolution, providing a rotational measurement resolution of 0.09 degrees. If, for example, a syringe is rotating at 30 rpm and the 4000 encoder edge transitions are monitored every microsecond (μs), then an accuracy of the rotation measurement is 0.00018 degrees (rotational speed=30 rpm=180 degree/s=0.00018 degrees/μs). For a syringe of 1 centimeter in diameter, this amount of rotational accuracy per revolution corresponds to a displacement of 0.016 µm on an outside perimeter of the syringe, which may be well below an optical resolution of the imaging system used to monitor for particles (e.g., about 21.5 µm per pixel in one imaging system evaluated). Accordingly, image acquisition may be triggered from the motor encoder signals to acquire a sufficient number of images per revolution to evaluate presence, size, and distribution of particles.

Because synchronization is based on the signals from the motor, the techniques of the present disclosure can be applied to any periodic motor movement and are not limited to steady rotation. For example, it is possible for an agitation profile to generate oscillatory shear flow propagating from the vessel wall into a core of the vessel.

Rotating the vessel slowly during imaging may help to mitigate challenges related to a lensing effect. The lensing effect can occur when a curvature of a body of fluid in a cylindrical vessel causes refraction of light that passes through the curvature. The lensing effect may cause a magnification of particles located towards a rear of the container. Additionally, when viewed orthogonally, the refraction from the lensing effect can cause blind spots towards a rear of the vessel, which may be especially true for highly viscous products if limited fluid motion fails to move particles out of the blind spots. The system and techniques of the present disclosure mitigate challenges related to the lensing effect by keeping the particles moving such that the particles will eventually pass through detection regions. A recording window can be set long enough so that particles will pass out of the blind spots and into the detection regions.

The system and techniques of embodiments of the present disclosure further provide for detection of particles in non-cylindrical vessels and vessels which are asymmetrical about a long axis of the vessel, or vessels with a cross-section that varies along a length of the vessel.

As can be seen by the above examples of embodiments of the present disclosure, the techniques described herein may be used to count, size, track, or characterize particles. In some embodiments, such capability may be used to detect unintended particles, for example to verify that a quantity or size of the particles is within guidelines. In other embodiments, such capability may be used to detect intended particles, for example particles that are intrinsic or native to a fluid. Thus, for example, detection of particles may be used for testing prior to sale of a product, or testing to characterize a product, or may be used to evaluate a product at different times, to identify changes in the product over time, such as growth, shrinkage, degradation, or disintegration of particles.

Figure 6:
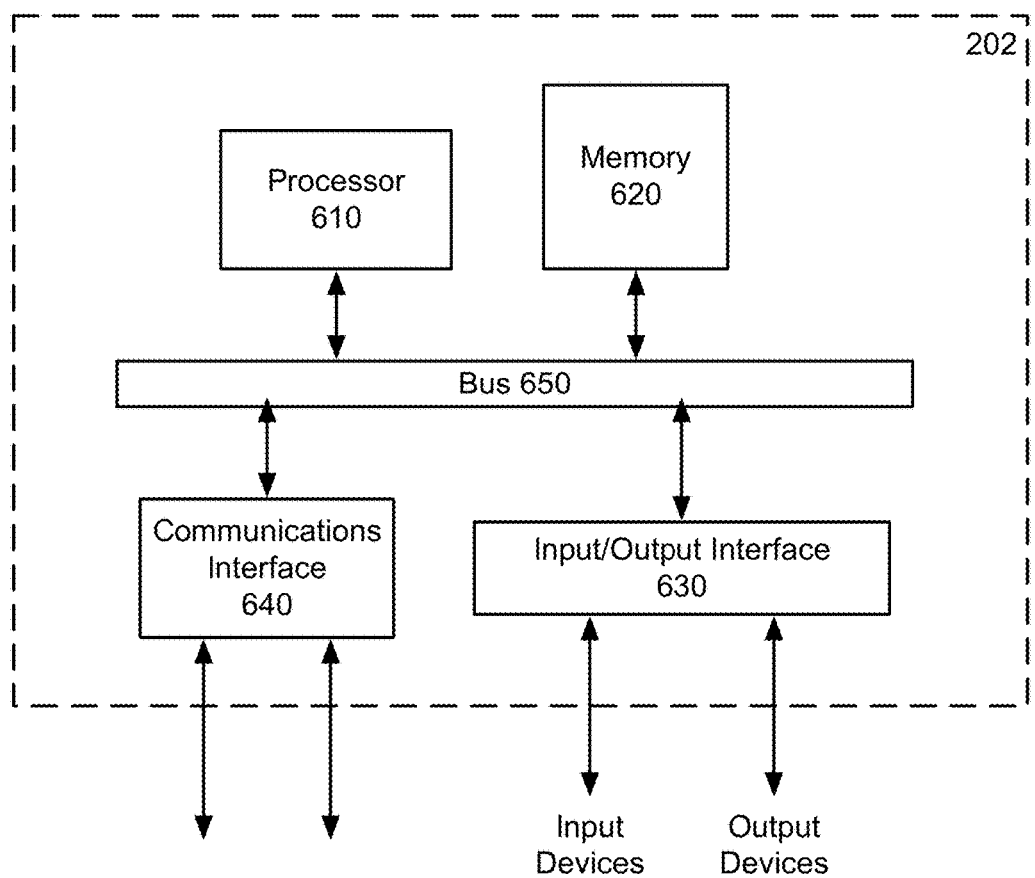
FIG. 6 illustrates an example of a controller.

FIG. 6 illustrates an example of a controller 202 according to an embodiment of the present disclosure. The controller 202 includes a processor 610, a memory 620, an input/output interface 630, and a communication interface 640. A bus 650 provides a communication path between two or more of the components of the controller 202. The components shown are provided by way of illustration and are not limiting. The controller 202 may have additional or fewer components, or multiple of the same component.

Processor 610 represents one or more of a processor, microprocessor, microcontroller, ASIC, and/or FPGA, along with associated logic.

Memory 620 represents one or both of volatile and non-volatile memory for storing information. Examples of memory include semiconductor memory devices such as EPROM, EEPROM, RAM, and flash memory devices, discs such as internal hard drives, removable hard drives, magneto-optical, CD, DVD, and Blu-ray discs, memory sticks, and the like.

Portions of the imaging system of the present disclosure may be implemented as computer-readable instructions in memory 620 of the controller 202, executed by processor 610.

Input/output interface 630 represents electrical components and optional code that together provides an interface from the internal components of the controller 202 to external components. Examples include a driver integrated circuit with associated programming.

Communications interface 640 represents electrical components and optional code that together provides an interface from the internal components of the controller 202 to external networks.

Bus 650 represents one or more interfaces between components within the controller 202. For example, bus 650 may include a dedicated connection between processor 610 and memory 620 as well as a shared connection between processor 610 and multiple other components of the controller 202.

An embodiment of the disclosure relates to a non-transitory computer-readable storage medium having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as ASICs, programmable logic devices ("PLDs"), and ROM and RAM devices.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

As used herein, the singular terms "a," "an," and "the" may include plural referents unless the context clearly dictates otherwise.

As used herein, relative terms, such as "above," "below," "up," "left," "right," "down," "top," "bottom," "vertical," "horizontal," "side," "higher," "lower," "upper," "over," "under," "inner," "interior," "outer," "exterior," "front," "back," "upwardly," "lower," "downwardly," "vertical," "vertically," "lateral," "laterally" and the like refer to an orientation of a set of components with respect to one another; this orientation is in accordance with the drawings, but is not required during manufacturing or use.

As used herein, the terms "connect," "connected," and "connection" refer to an operational coupling or linking. Connected components can be directly or indirectly coupled to one another, for example, through another set of components.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, technique, or process to the objective, spirit and scope of the present disclosure. All such modifications are intended to be within the scope of the claims appended hereto. While the techniques disclosed herein have been described with reference to particular operations performed in a particular order, it will be understood that these operations may be combined, sub-divided, or re-ordered to form an equivalent technique without departing from the teachings of the present disclosure. Accordingly, unless specifically indicated herein, the order and grouping of the operations are not limitations of the present disclosure.

What is claimed is:

1. A method comprising:
during an agitation period of an agitation profile, applying a motion to a transparent vessel containing a fluid acquiring, via one or more imagers while applying the motion, a sequence of original images of a portion of the transparent vessel, the acquisition of the sequence of original images being synchronized to the agitation profile such that each original image in the sequence of original images corresponds to the transparent vessel being in the same position;
generating, via one or more processors, a background image from the sequence of original images;
generating, via one or more processors, a resultant image from the background image and an original image in the sequence of original images; and
identifying, via one or more processors, a particle in the fluid from the resultant image.

2. The method of claim 1, wherein:
the agitation period includes a first agitation period and a second agitation period that is subsequent to the first agitation period,
the first agitation period includes applying a first motion, and
the second agitation period includes applying a second motion.

3. The method of claim 2, wherein the first motion or the second motion comprises spinning, rotating, shaking, oscillating or flipping the transparent vessel.

4. The method of claim 3, wherein the first motion includes spinning the transparent vessel at a first rate.

5. The method of claim 4, wherein the second motion includes spinning the transparent vessel at a second rate that is slower than the first rate.

6. The method of claim 1, wherein the agitation profile further comprises applying acoustic energy or ultrasonic energy to the transparent vessel prior to the agitation period.

7. The method of claim 1, further comprising:
rotating the transparent vessel by an integer multiple of 360 degrees between acquiring sequential images from among the sequence of original images.

8. The method of claim 7, wherein the integer multiple of 360 degrees varies between acquiring sequential images from among the sequence of original images.

9. The method of claim 1, wherein the transparent vessel is a syringe.

10. The method of claim 1, wherein the fluid substantially fills the transparent vessel such that the transparent vessel does not include an air gap.

11. The method of claim 1, wherein the transparent vessel is asymmetrical about a long axis of the transparent vessel.

12. The method of claim 1, wherein a cross-section of the transparent vessel varies along a length of the transparent vessel.

13. The method of claim 1, wherein the transparent vessel is non-cylindrical.

14. An inspection system comprising:
an agitator configured to receive a transparent vessel containing a fluid and to apply a motion to the transparent vessel during an agitation period of an agitation profile;
an imager configured to acquire a sequence of original images of the transparent vessel as the agitator applies the motion, the imager being synchronized to the agitation profile such that each original image in the sequence of original images corresponds to the transparent vessel being in the same position; and
a controller configured to:
receive from the imager the sequence of original images;
identify common features of at least two original images in the sequence of original images;
generate a background image including the common features;

generate one or more resultant images from the background image and the sequence of original images; and identify, from the background image, a particle in the fluid.

15. The system of claim 14, wherein the agitator is configured to spin, rotate, oscillate, or flip the transparent vessel.

16. The system of claim 14, wherein the agitator is configured to apply at least one of acoustic energy or ultrasonic energy to the transparent vessel.

17. The system of claim 14, wherein:
the agitation period includes a first agitation period and a second agitation period, the first agitation period being subsequent to the second agitation period, and
the agitator is configured to spin the transparent vessel at a first rotational velocity during the first agitation period and to spin the transparent vessel at a second, slower rotational velocity, during the second agitation period.

18. The system of claim 14, wherein the agitator is further configured to flip the transparent vessel prior to the agitation period.

19. The system of claim 18, wherein the agitator is further configured to spin the transparent vessel during the flipping of the transparent vessel.

20. The system of claim 14, wherein the agitator comprises a motor, the system further comprising:
a triggering circuit configured to receive rotational information from the motor and to provide a trigger signal to initiate the imager to acquire an image of the transparent vessel to facilitate the acquisition of the sequence of original images being synchronized to the agitation profile.

21. A method comprising:
during an agitation period of an agitation profile, acquiring a sequence of original images of a portion of a transparent vessel via one or more imagers, the acquisition of the sequence of original images being synchronized to the agitation profile such that each original image in the sequence of original images corresponds to the transparent vessel being in the same position;
determining, via one or more processors, a background image from the sequence of original images;
generating, via one or more processors, at least one resultant image from the background image and the sequence of original images; and
identifying, via one or more processors, at least one particle in the fluid from the resultant image.

22. The method of claim 21, wherein the sequence of original images is a sequence of two original images.

23. The method of claim 21, wherein:
the agitation profile includes a first agitation period and a second agitation period, the first agitation period being prior to the second agitation period.

24. The method of claim 23, further comprising:
applying a violent motion to the transparent vessel during the first agitation period.

* * * * *